March 24, 1931. E. GESSNER 1,797,982
POWER TRANSMITTING AND SPEED CHANGING MECHANISM
Filed Feb. 14, 1930 3 Sheets-Sheet 1
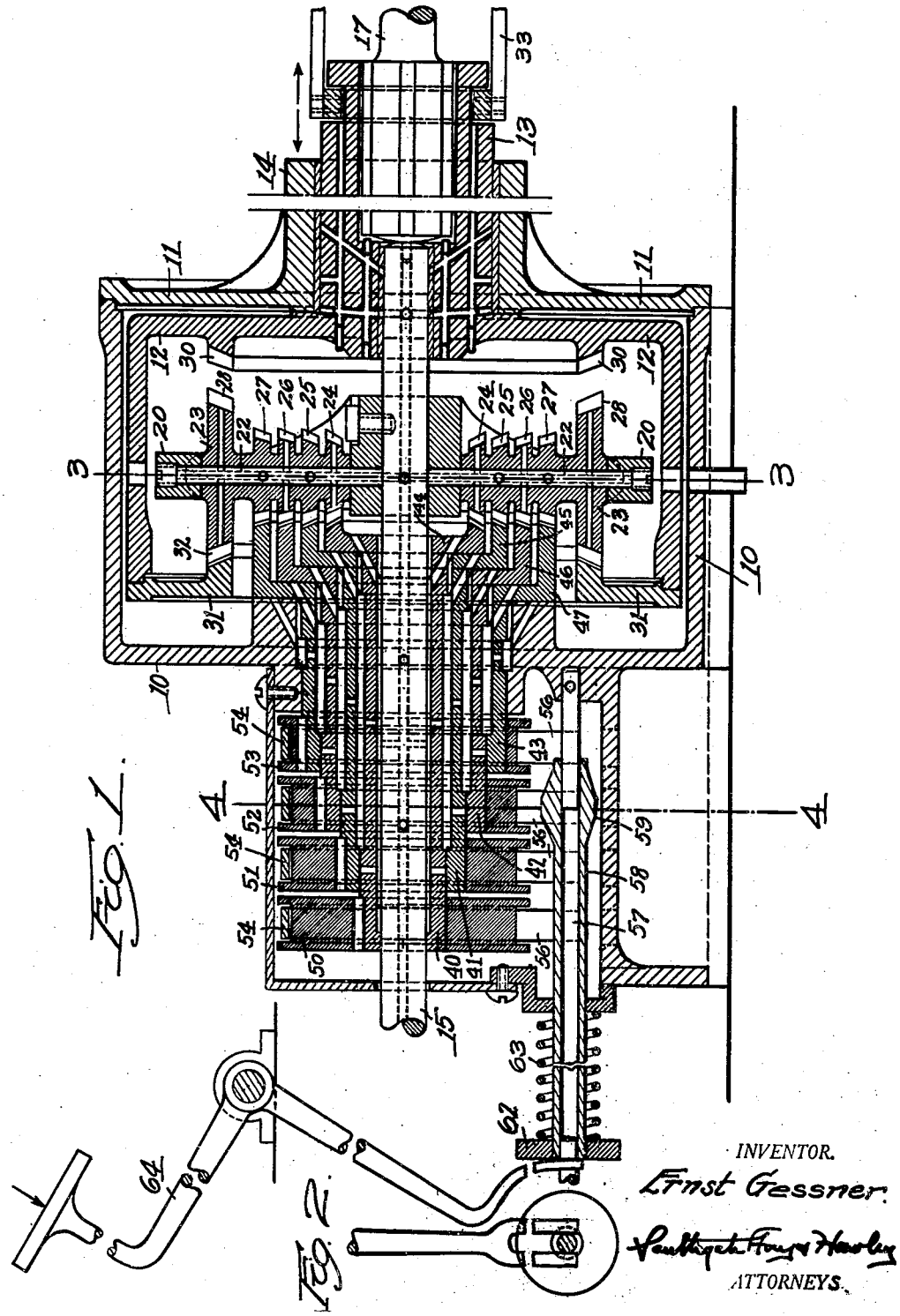
INVENTOR.
Ernst Gessner
ATTORNEYS March 24, 1931. E. GESSNER 1,797,982
POWER TRANSMITTING AND SPEED CHANGING MECHANISM
Filed Feb. 14, 1930   3 Sheets-Sheet 2
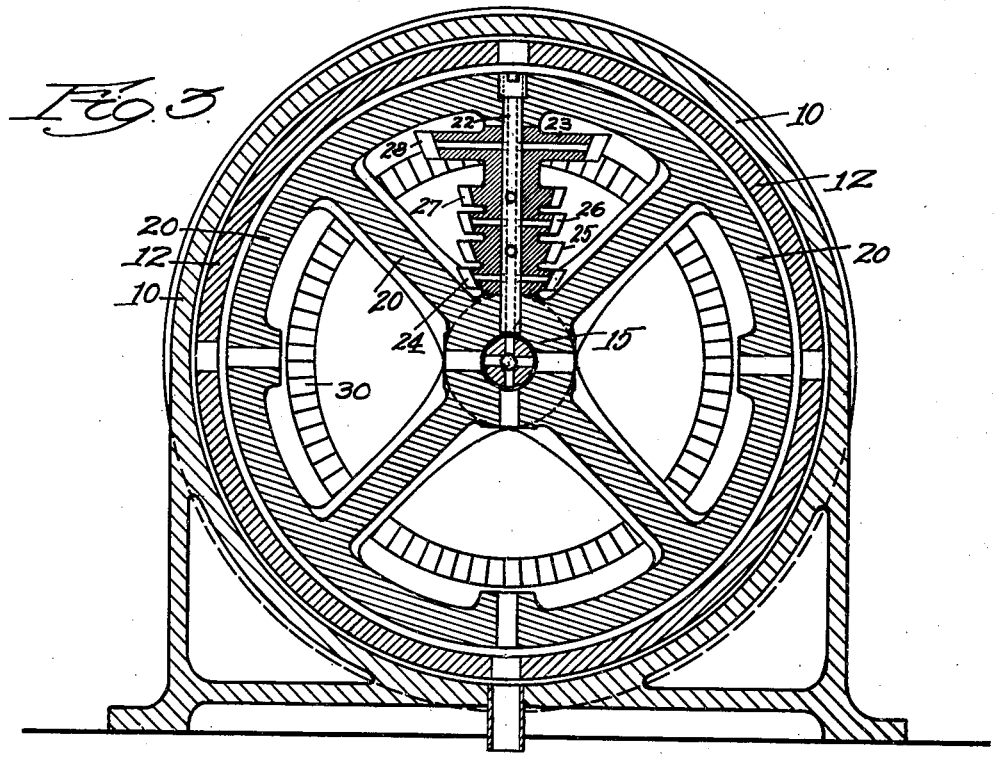
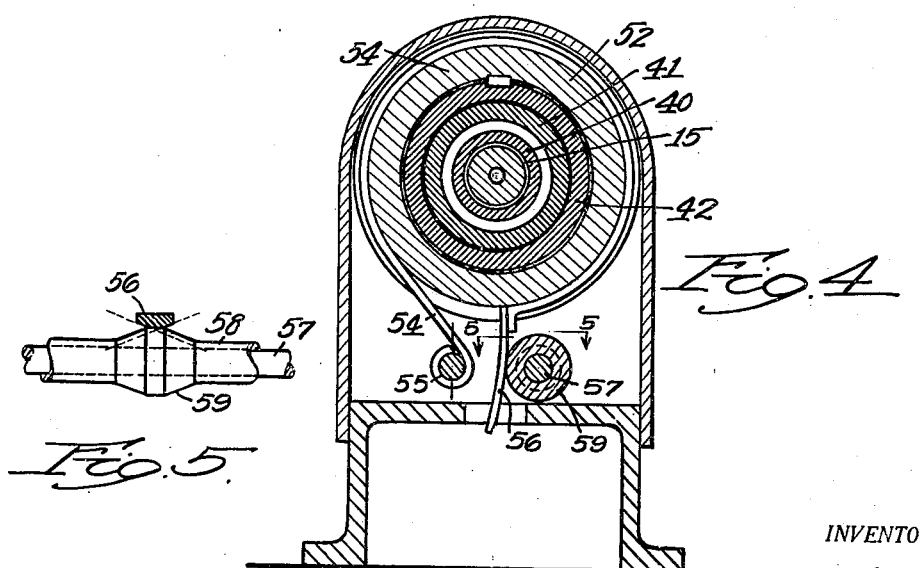
INVENTOR.
Ernst Gessner
BY
ATTORNEYS.

Patented Mar. 24, 1931

1,797,982

UNITED STATES PATENT OFFICE

ERNST GESSNER, OF WORCESTER, MASSACHUSETTS

POWER-TRANSMITTING AND SPEED-CHANGING MECHANISM

Application filed February 14, 1930. Serial No. 428,539.

This invention relates to mechanism for transmitting power in a plurality of predetermined speed ratios.

It is the object of my invention to provide improved mechanism for transmitting power from a driving to a driven member and to provide devices for quickly and easily effecting speed variations or reversals of motion in such transmitting mechanism.

A further object of the invention is to provide a construction in which a plurality of pairs of bevel gears are constantly in mesh but in which the different pairs of gears are rendered selectively operative by movement of a manually controlled device.

My invention further relates to arrangements and combinations of parts which will be hereinafter described and more particularly pointed out in the appended claims.

Two preferred forms of the invention are shown in the drawings, in which

Fig. 1 is a sectional side elevation of one form of my invention;

Fig. 2 is a detail end elevation of certain parts;

Figure 6:
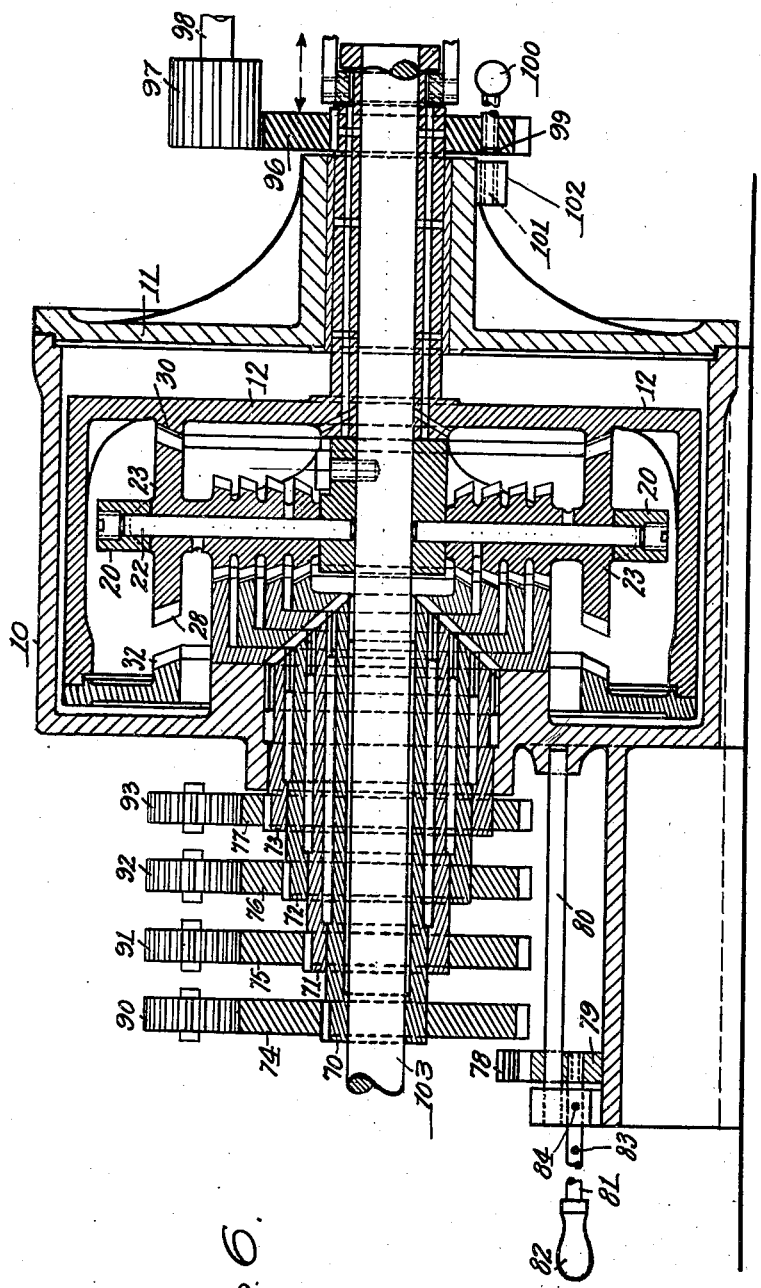

Figs. 3 and 4 are sectional end elevations, taken along the lines 3—3 and 4—4 in Fig. 1 respectively;

Fig. 5 is a detail sectional plan view of certain parts, taken along the line 5—5 in Fig. 4; and Fig. 6 is a sectional side elevation of a modified construction.

Referring particularly to Figs. 1 to 5, I have shown a power-transmitting and speed changing mechanism comprising a casing 10 mounted in fixed position and having a cover plate 11 secured to one end thereof. An inner casing 12 is provided with a hub or sleeve 13 which is both slidable and rotatable in a bearing hub 14 of the casing cover plate 11.

A driving shaft 15 is supported for free rotation at its inner end in a bearing in the center of the hub 13, and a driven shaft 17 is also supported in a bearing in said hub but is keyed thereto, so as to be rotated thereby. The casing 12 and hub portion 13 are axially slidable with respect to both the driving and the driven shafts.

A rotatable gear frame or spider 20 (Fig. 3) is secured to the driving shaft 15 and is rotated thereby within the inner casing 12. The member 20 is provided with a plurality of radially extending shafts 22 on each of which a gear member 23 is freely rotatable. Each gear member 23 comprises a series of bevel gears 24, 25, 26, 27 and 28, all formed on a common sleeve or bushing.

The inner casing member 12 is provided with a bevel gear 30 on its inner face and is also provided with a cover plate 31 supporting a bevel gear 32. The gears 30 and 32 may be alternately and selectively engaged with the outer bevel gear 28 of each gear member 23 by moving the inner casing 12 axially within the fixed casing 10. Such axial movement may be produced manually by means of the yoke member 33 shown at the right in Fig. 1.

A series of concentric sleeves 40, 41, 42 and 43 are supported for independent rotation on the driving shaft 15 and are provided at their inner ends with bevel gears 44, 45, 46 and 47, continuously engaging the bevel gears 24, 25, 26 and 27 previously described.

The sleeves 40 to 43 are also provided with grooved pulleys or brake-drums 50, 51, 52 and 53, each of which receives a brake-band 54 between the flanged edges thereof. One end of each brake-band 54 (Fig. 4) is secured to a fixed rod 55 and the other end of the brake-band is provided with a slightly resilient or spring member 56 extending downward alongside a fixed rod 57 on which a sleeve 58 (Fig. 5) is slidable.

The sleeve 58 is provided with an enlargement 59 adapted to engage a selected spring member 56 and to force the same to the left, as viewed in Fig. 4, to apply braking pressure and hold the corresponding brake-drum from rotation.

The sleeve 58 is provided with a head 62 engaged by a coil spring 63 and yieldingly forced to the left in Fig. 1. Any suitable mechanism such as a foot pedal 64 may be provided for moving the sleeve 58 to the right to successively engage the different resilient members 56.

Having described this form of my invention, the operation thereof is as follows:—As the sleeve 58 is moved to cause its enlarged portion 59 to engage a selected spring member 56, the corresponding bevel gear 44, 45, 46 or 47 will be held from rotation.

Assuming that the inner casing 12 is in the right hand position indicated in Fig. 1, (placing the gear 28 in mesh with the gear 32) the tightening of a brake-band to hold a selected bevel gear stationary will produce the following result:

If the smallest bevel gear 44 is held stationary and the driving shaft 15 is rotated, the gear members 23 will receive two different movements. In the first place, they will be rotated bodily with the spider 20 on the shaft 15 and in the same direction. In the second place, they will be rotated about their own axes by the engagement of their bevel gears 24 with the bevel gear 44 which is temporarily held from rotation. As the ratio of the gears 24 to the gear 44 is greater than the ratio of the gears 28 to the gear 32, the gear 32 and its supporting inner casing 12 will be rotated at relatively slow speed and in the same direction as the shaft 15.

If the next larger bevel gear 45 is held from rotation, the inner casing 12 will remain stationary or neutral, as the gears 45 and 25 have the same ratio as the gears 32 and 28.

On the other hand, the ratio of the gears 26 to the gear 46 and the ratio of the gears 27 to the gear 47 are both smaller than the ratio of the gears 28 to the gear 32, so that when the bevel gear 46 or the bevel gear 47 is held stationary, the inner casing 12 will be driven in the opposite direction to that of the driving shaft 15 and at either one of two different speeds.

If the inner casing 12 is shifted to the left, so as to cause the gears 28 to engage the bevel gear 30, four additional speeds will be secured, all in the same direction as the rotation of the shaft 15.

When the foot pedal 64 is released, the spring 63 moves the sleeve 58 to an inoperative left hand position and the inner casing 12 and driven shaft 17 remain stationary, while the several bevel gears 44 to 47 and their associated sleeves 40 to 43 are rotated freely by the engagement of the gears 28 with the gears 30 or 32 which remain stationary.

In Fig. 6 I have shown a modified form of my invention which somewhat resembles the form previously described. In place of the brake-bands and drums for holding the bevel gears and sleeves stationary, I have provided the sleeves 70, 71, 72 and 73 with spur gears 74, 75, 76 and 77 any one of which may be engaged by gear teeth 78 on a block 79 which is slidable but non-rotatable on a guide-rod 80.

A push rod 81 is secured to the block 79 and is provided with a handle 82 by which the block 79 may be moved along the rod 80 to engage any selected gear 74 to 77. The push rod 81 is provided with holes 83 to receive the locking pin 84 by which the block 79 may be held in an adjusted position.

Pinions 90, 91, 92 and 93 may be mounted in mesh with the gears 74 to 77 respectively and may be connected to deliver or receive power as desired.

Power may be taken from the driven casing 12 by a gear 96 meshing with an elongated pinion 97 on a counter shaft 98. The gear 96 is provided with a hole 99 adapted to receive a locking pin 100 which may be inserted in the hole 99 and pushed therethrough into a hole 101 in a fixed lug or projection 102.

Assuming that the pin 100 is removed and that the pinions 90 to 93 are left free to rotate, the mechanism operates in the same manner as the construction shown in Figs. 1 to 5 and previously described in detail.

Briefly, rotation of the drive shaft 103 in a given direction causes slow rotation of the driven gear 96 in the same direction when the block 79 engages the gear 74 and holds the same from rotation. If the gear 75 is held from rotation, the driving gear 96 is held stationary or neutral. If the gear 76 is blocked, the gear 96 will be rotated in a direction opposite to that of the driving shaft 103, and if the gear 77 is blocked, the rotation of the gear 96 will also be in the reverse direction, but at a higher speed.

These speed relations assume that the inner casing is in the right hand position corresponding to that shown in Fig. 1.

If, however, the inner casing is in the left hand position indicated in Fig. 6, blocking of any one of the gears 74 to 77 will cause rotation of the driven gear 96 in the same direction as the shaft 103 and at increasingly rapid rates.

If the inner casing is moved to mid-position so that both of the bevel gears mounted on the inner walls of the inner casing are disengaged, and if the locking pin 100 is then inserted, power may be taken from any three of the pinions 90 to 93 by blocking the gear 74 to 77 associated with the remaining pinion. For example, if the gear 74 is blocked, power may be taken from the pinions 91, 92 or 93.

If the pin 100 is inserted when either of the bevel gears 30 or 32 are engaged by the gears 28, and the driving shaft is rotated, all of the gears 74 to 77 will be rotated at various speeds and directions and power may be taken from any of the pinions 90 to 93. The apparatus is also to some extent reversible, and in certain combinations the shafts 17 and 98 may be used as drive shafts, while the shafts 15 and 103 become driven shafts.

Having thus described my invention and the advantages thereof, I do not wish to be limited to the details herein disclosed, otherwise than as set forth in the claims, but what I claim is:—

1. Power transmitting and speed changing mechanism comprising a fixed outer casing, an inner casing rotatable therein and having a bevel gear mounted on one inner side face thereof, a driven shaft connected to be rotated by said inner casing, a rotating driving shaft, a gear frame rotatable with said driving shaft, a plurality of radially extending shafts mounted in said gear frame, a plurality of sets of bevel gears, each set being mounted as a freely rotating unit on one of said radial shafts with the outer gear in each set positioned for engagement by the bevel gear on said inner casing, a plurality of additional bevel gears mounted for independent rotation about the axis of said driving shaft and meshing with associated bevel gears in said freely rotatable units, and means to hold a selected one of said additional bevel gears from rotation.

2. The combination in a power transmitting and speed changing mechanism as set forth in claim 1, in which said latter means comprises a spur gear rotatable with each additional bevel gear and a selective non-rotatable gear element slidable into engagement with any one of said spur gears.

3. The combination in a power transmitting and speed changing mechanism as set forth in claim 1, in which one of said additional bevel gears is in such size relation to the associated bevel gears engaged thereby that when said additional bevel gear is held from rotation the inner casing and driven shaft will remain in fixed position while the driving shaft and gear frame rotates.

4. The combination in a power transmitting and speed changing mechanism as set forth in claim 1, in which both inner side walls of said inner casing are provided with bevel gears and in which provision is made for sliding said inner casing axially to selectively engage either of said inner bevel gears with the outer bevel gears in the rotating gear frame.

5. The combination in a power transmitting and speed changing mechanism as set forth in claim 1, in which both inner side walls of said inner casing are provided with bevel gears and in which provision is made for sliding said inner casing axially to selectively engage either of said inner bevel gears with the outer bevel gears in the rotating gear frame, and in which provision is made for holding said inner casing from rotation in such axial position that both inner bevel gears are disengaged from the gears in said gear frame.

6. The combination in a power transmitting and speed changing mechanism as set forth in claim 1, in which both inner side walls of said inner casing are provided with bevel gears and in which provision is made for sliding said inner casing axially to selectively engage either of said inner bevel gears with the outer bevel gears in the rotating gear frame, and in which provision is made for holding said inner casing from rotation with one of said side bevel gears engaged.

In testimony whereof, I have hereunto affixed my signature.

ERNST GESSNER.